US008977980B2

(12) United States Patent
Abe et al.

(10) Patent No.: US 8,977,980 B2
(45) Date of Patent: Mar. 10, 2015

(54) DISPLAY SCROLLING METHOD, DISPLAY APPARATUS, AND RECORDING MEDIUM HAVING DISPLAY PROGRAM RECORDED THEREON

(75) Inventors: Yuichi Abe, Tokyo (JP); Yoichiro Sako, Tokyo (JP); Itaru Kawakami, Kanagawa (JP); Mitsuru Takehara, Tokyo (JP); Takatoshi Nakamura, Ibaraki (JP)

(73) Assignee: Sony Corporation, Tokyo (JP)

( * ) Notice: Subject to any disclaimer, the term of this patent is extended or adjusted under 35 U.S.C. 154(b) by 1189 days.

(21) Appl. No.: 11/894,173

(22) Filed: Aug. 20, 2007

(65) Prior Publication Data

US 2008/0052636 A1 Feb. 28, 2008

(30) Foreign Application Priority Data

Aug. 28, 2006 (JP) ................................ 2006-230392

(51) Int. Cl.
*G06F 3/048* (2013.01)
*G06F 3/0485* (2013.01)
*G06F 3/00* (2006.01)

(52) U.S. Cl.
CPC ..................................... *G06F 3/0485* (2013.01)
USPC .......................................... 715/786; 715/787

(58) Field of Classification Search
USPC .................................................. 715/786, 787
See application file for complete search history.

(56) References Cited

U.S. PATENT DOCUMENTS

| | | | | |
|---|---|---|---|---|
| 6,421,071 B1 * | 7/2002 | Harrison | ........................ | 715/787 |
| 6,486,896 B1 * | 11/2002 | Ubillos | ......................... | 715/784 |
| 2002/0077998 A1 * | 6/2002 | Andrews et al. | ................... | 707/1 |
| 2003/0051214 A1 * | 3/2003 | Graham et al. | ................ | 715/512 |
| 2004/0221237 A1 * | 11/2004 | Foote et al. | ..................... | 715/700 |
| 2005/0044066 A1 * | 2/2005 | Hooper et al. | ...................... | 707/3 |
| 2005/0080769 A1 * | 4/2005 | Gemmell et al. | .................. | 707/3 |
| 2006/0174214 A1 * | 8/2006 | McKee et al. | .................. | 715/802 |
| 2007/0296740 A1 * | 12/2007 | Yu et al. | ......................... | 345/684 |
| 2008/0222557 A1 | 9/2008 | Abe et al. | | |

FOREIGN PATENT DOCUMENTS

| | | |
|---|---|---|
| JP | 04-022995 A | 1/1992 |
| JP | 04-348476 A | 12/1992 |
| JP | 05-298052 A | 11/1993 |
| JP | 05-324237 A | 12/1993 |

(Continued)

OTHER PUBLICATIONS

Microsoft Office Outlook 2003 SP2 release date Sep. 27, 2005 screenshots 7 pages.*
Microsoft Office Outlook 2003 SP2 release date Sep. 27, 2005 screenshots 10 pages.*
[No Author Listed], Hash table. Wikipedia. Sep. 2006, 13 pages. Retrieved Sep. 25, 2010 from Http://kiwitobes.com/wiki/Hash_table.html.

(Continued)

*Primary Examiner* — Andrea Long
(74) *Attorney, Agent, or Firm* — Wolf, Greenfield & Sacks, P.C.

(57) ABSTRACT

A display scrolling method includes the steps of displaying first and second windows on a display screen of a display; displaying first information in a predetermined order in the first window; displaying second information in a predetermined order in the second window; and scrolling the first and second information in synchronization with each other, wherein the resolution of the scrolling of at least one of the first and second information is set at a magnitude corresponding to the unit of the classification of the information.

15 Claims, 11 Drawing Sheets

(56) References Cited

FOREIGN PATENT DOCUMENTS

| | | |
|---|---|---|
| JP | 11-212700 A | 8/1999 |
| JP | 11-250053 A | 9/1999 |
| JP | 2000-039947 A | 2/2000 |
| JP | 3070778 B2 | 7/2000 |
| JP | 2002-041736 A | 2/2002 |
| JP | 2002-073679 A | 3/2002 |
| JP | 2003-075473 | 3/2003 |
| JP | 2004-021596 A | 1/2004 |
| JP | 2005-018785 A | 1/2005 |
| JP | 2006-033776 A | 2/2006 |
| JP | 2006-050176 A | 2/2006 |
| KR | 1996-0003043 B1 | 3/1996 |
| KR | 2002-0019429 A | 3/2002 |

OTHER PUBLICATIONS

Boyce, Jim, Microsoft Office Outlook 2003 inside out. Microsoft Press. Nov. 2003, Chapter 3, 21 pages. Retrieved Sep. 25, 2010 from Http://Proquest.Safaribooksonline.com/0735615144.

[No Author] "Revision history of Hash table." Wikipedia. Online. Http://en.wikipedia.org/w/index.php?title=Hash_table&action=history&year=2006&month=9&tagfilter=. 6 pages. Printed Mar. 10, 2011.

[No Author] "Wayback Machine: Http:/en.wikipedia.org/wiki/Hash_table." Internet Archive. Online. Http://waybackmachine.org/20060615000000*/en.wikipedia.org/wiki/Hash_table. 6 pages. Printed Mar. 10, 2011.

Boyce, Microsoft Office Outlook 2003 Inside Out. Chapter 1. 31 pages.

\* cited by examiner

DISPLAY SCROLLING METHOD, DISPLAY APPARATUS, AND RECORDING MEDIUM HAVING DISPLAY PROGRAM RECORDED THEREON

The present invention contains subject matter related to Japanese Patent Application JP 2006-230392 filed in the Japanese Patent Office on Aug. 28, 2006, the entire contents of which are incorporated herein by reference.

BACKGROUND OF THE INVENTION

1. Field of the Invention

The present invention relates to a display scrolling method and a display program.

2. Description of the Related Art

As personal computers have become popular, opportunities of managing or storing various kinds of data files, for example, a data file of images captured using a digital camera, a data file of downloaded pieces of music or movie, and a data file of a blog, have increased.

As a method of selecting a target data file from among stored data files, a method of using size-reduced thumbnail images (hereinafter, referred to simply as "thumbnails") is known. That is, for example, in the case of a data file of images captured using a digital camera, thumbnails of images are created, and these thumbnails are displayed in a list. Then, if the thumbnail of the target image is found, the thumbnail is clicked. Then, the data file of the target image is selected, and the image is displayed at its original size and state on a display.

In the case of pieces of music, thumbnails of jacket images of pieces of music are displayed in a list. Then, when one of the thumbnails is clicked, the data file of the corresponding piece of music is selected, and the reproduction of the piece of music is started.

However, as the number of data files (the number of files) increases, the number of thumbnails is also increased in proportion. Therefore, there is a need for a method of displaying the thumbnails. Accordingly, as display methods, the following methods have been considered:

(1) A method in which thumbnails are displayed chronologically, and the resolution (scale) of a time axis is made variable.

(2) A method in which thumbnails are displayed in two time axes having different resolutions.

In the method (1), the time-related resolution (time interval) of thumbnails is changed to, for example, day, month, or year by reducing the number of thumbnails to be displayed similarly to the case in which, for example, when the scale of a map is changed when the map is to be displayed, the entirety is displayed or a part thereof is enlarged and displayed.

According to the method (1), by changing the resolution of the time axis as desired, it is possible to view the entirety at a glance or to view areas of particular interest in detail.

On the other hand, the method (2) is, for example, a method shown in FIG. 9. That is, FIG. 9 shows a case in which data files of pieces of music and the thumbnails thereof are managed using a personal computer. A reference numeral 10 denotes a display screen (display area) of a display of the personal computer. On the display screen 10, windows 11A and 11B having a horizontally long rectangular shape are displayed in two areas in the vertical direction.

In the window 11A of the upper area, thumbnails 12A of jacket images of pieces of music are displayed chronologically by year. That is, the thumbnails 12A are thumbnails of the jacket images of the best selling pieces of music among the pieces of music that were sold in corresponding years, and the thumbnails are displayed in the window 11A in such a manner as to be arranged in one horizontal line in chronological order of year in which they were sold. Above each of the thumbnails 12A, the "year" in which the piece of music corresponding to the thumbnail 12A was sold is displayed using a numeral 13A. Furthermore, in the lower area of the window 11A, a scroll bar 14A is displayed, and on both the left and right sides, scroll buttons 15A are displayed.

Similarly, in the window 11B of the lower area, thumbnails 12B of jacket images of pieces of music are displayed chronologically by month. In this case, the thumbnails 12B are thumbnails of the jacket images of the best selling pieces of music among the pieces of music sold in corresponding months, and these thumbnails are displayed in the window 11B in such a manner as to be arranged in one horizontal line in chronological order of month in which they were sold. The thumbnails 12B for corresponding months continue to the following year. That is, a thumbnail of December in a certain year is to the left of the thumbnail of January of the next year. In other words, a thumbnail of January of the next year is to the right of a thumbnail of December of the previous year.

Above each of the thumbnails 12B, "year month" in which the piece of music of the thumbnail 12B was sold is displayed using a numeral 13B. Furthermore, in the lower area of the window 11B, a scroll bar 14B is displayed, and scroll buttons 15B are displayed on both the right and left sides.

When the scroll bar 14A is dragged (moved) using a mouse (not shown) to the left or to the right, or when one of the scroll buttons 15A is depressed, the thumbnails 12A for corresponding years are continuously moved to the left or to the right. Therefore, when the scroll bar 14A or the scroll button 15A is operated, it is possible to display the thumbnail 12A of any year in the window 11A.

Similarly, when the scroll bar 14B or the scroll button 15B is operated, the thumbnails 12B for corresponding months are continuously moved to the left or to the right, so that the thumbnail 12B of any month can be displayed in the window 11B.

However, in this case, when the thumbnails 12A or 12B are moved by operating the scroll bars 14A and 14B or the scroll buttons 15A and 15B in the manner described above, as is also shown in FIG. 11, it is assumed that the thumbnails 12A and the thumbnails 12B are moved in a linearly synchronous manner.

That is, as is also shown in FIG. 10, when the thumbnails 12A for corresponding years are continuously moved by operating the upper scroll bar 14A or the upper scroll button 15A, the thumbnails 12B for corresponding months are continuously moved in a linearly synchronous manner with the movement of the upper scroll bar 14A or the upper scroll button 15A. The movement of the thumbnails 12B is in the same direction as that of the thumbnails 12A and is set at a scrolling rate 12 times that of the thumbnails 12A.

Conversely, when the thumbnails 12B for corresponding months are continuously moved by operating the lower scroll bar 14B or the lower scroll button 15B, the thumbnails 12A for corresponding years are linearly and continuously moved in a synchronous manner with the movement of the lower scroll bar 14B or the lower scroll button 15B. The movement of the thumbnails 12A is in the same direction as that of the thumbnails 12B and is set at a scrolling rate $\frac{1}{12}$ that of the thumbnails 12B.

That is, as is also shown in FIG. 11, the thumbnails 12A and the thumbnails 12B have different resolutions of a time axis, but move at the same speed with respect to time. For example, as shown in FIG. 9, when the thumbnail 12B of June 1999 is positioned in the center of the window 11B, the thumbnail 12A of 1999 is positioned slightly to the left of the center of the window 11A. That is, when the thumbnails 12A and 12B are to be displayed, synchronization is achieved so that a phase difference does not occur between the display position of the thumbnail 12A and the display position of the thumbnail 12B.

In the method (2), since the thumbnails 12A and 12B are displayed simultaneously arranged in the two time axes having different resolutions, viewing of the entirety at a glance and detailed comparison of information are easy. Furthermore, when one of the windows 11A and 11B is scrolled, the other is scrolled in a synchronous manner. Therefore, there is no need to scroll each of the two windows 11A and 11B individually, and operation time and effort can be reduced. Furthermore, if the resolutions of the time axes of the windows 12A and 12B are made equal to each other and are not synchronously moved, it is possible to compare the thumbnails 12A and 12B with each other.

As a reference document of the related art, for example, there is Japanese Unexamined Patent Application Publication No. 2003-75473.

SUMMARY OF THE INVENTION

However, in the case of the method (1), the resolution needs to be switched according to the situation, and therefore, the operation becomes complicated. Furthermore, even if a comparison is performed to determine which one of the two thumbnails is a target, this is not possible. Furthermore, since the thumbnails, the number of which is reduced, are displayed only when the time axis is expanded, whether or not the thumbnails have been reduced in number is not known unless the resolution is changed.

In the case of the method (2), the window 11A and the window 11B move in a linearly synchronous manner with their respective time-related resolutions. Therefore, the method may be inappropriate depending on display content.

For example, when the thumbnail 12B is scrolled from the state shown in FIG. 9 to the position at which December 1999 is in the center as shown in FIG. 10, the thumbnail 12A is scrolled to the position at which the portion between 1999 and 2000 is in the center. Then, when the thumbnail 12B is scrolled to the position at which January 2000 is in the center, the thumbnail 12A is scrolled slightly to the left from the position at which the portion between 1999 and 2000 is in the center.

For this reason, in the window 11B, regardless of the fact that the thumbnail 12B being browsed is changed from one for 1999 to one for 2000, the display of the thumbnail 12A does not change much. By only viewing the window 11A, it is difficult to instantly understand whether the thumbnail 12A for 1999 is in the center or the thumbnail 12B for 2000 is in the center, thereby causing confusion.

It is desirable to solve the above-described problems.

According to an embodiment of the present invention, there is provided a display scrolling method including the steps of: displaying first and second windows on a display screen of a display; displaying first information in a predetermined order in the first window; displaying second information in a predetermined order in the second window; and scrolling the first and second information in synchronization with each other, wherein the resolution of the scrolling of at least one of the first and second information is set at a magnitude corresponding to the unit of the classification of the information.

According to an embodiment of the present invention, in two windows that are scrolled synchronously, when thumbnails of the window of a synchronously moving origin are scrolled, thumbnails of the window of a synchronously moving follower are scrolled in units of the display. Therefore, the correspondence between thumbnails of the synchronously moving origins and thumbnails of the synchronously moving follower is easy to understand, and it is possible to instantly understand the correspondence between two thumbnails.

DESCRIPTION OF THE PREFERRED EMBODIMENTS

[1] Example of Display

Figure 1:
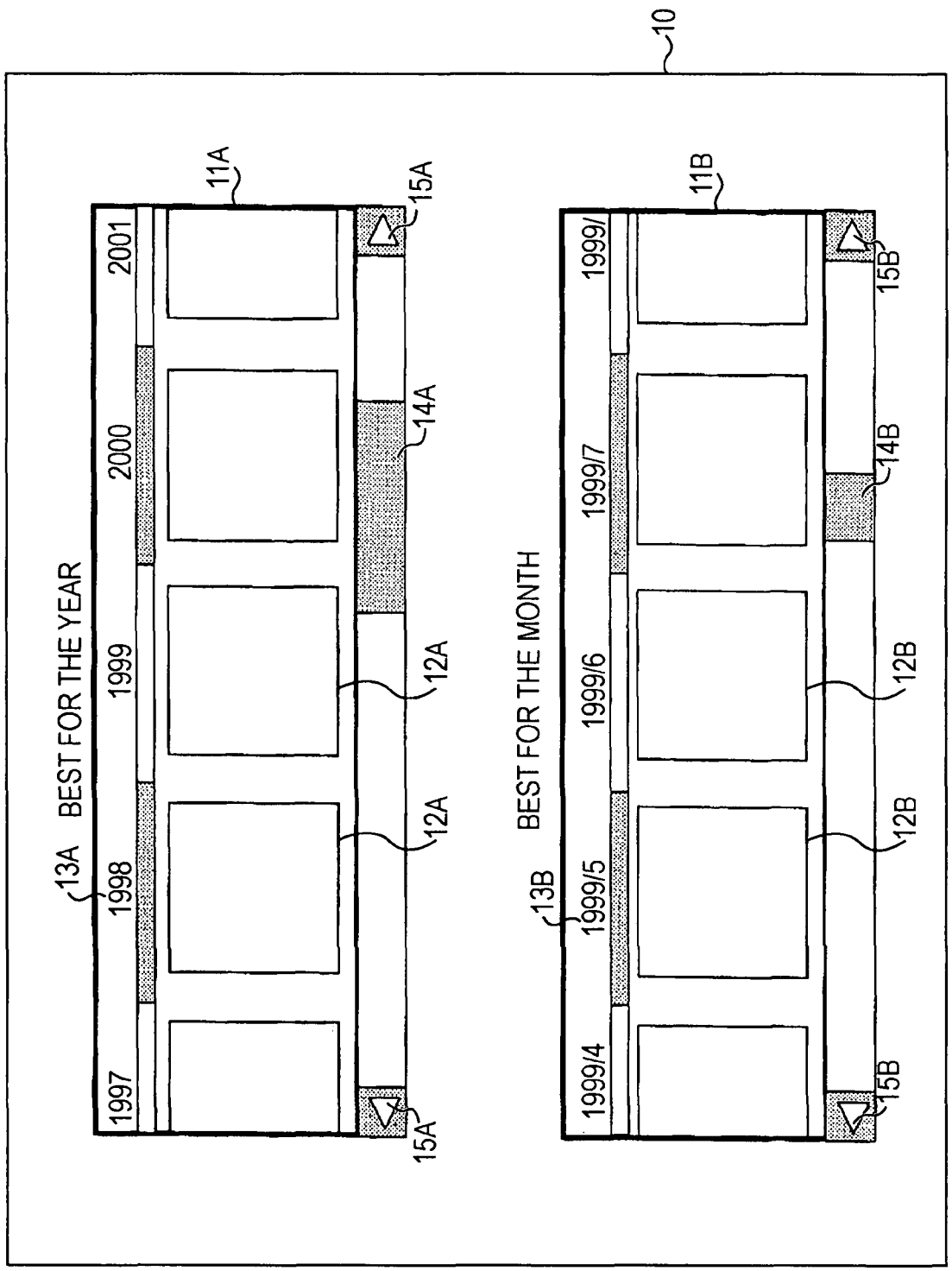
FIG. 1 shows an example of a display according to an embodiment of the present invention.

FIG. 1 shows an example of a display according to an embodiment of the present invention. Similarly to the case in FIG. 9, this example shows a case in which data files of pieces of music and thumbnails of the pieces of music are managed using a personal computer, and thumbnails are used for jacket images of CDs of pieces of music. In FIG. 1, reference numeral 10 denotes a display screen (display area) in a display of the personal computer, and this example shows a case in which the entire area of the display screen 10 is used.

On the display screen 10, windows 11A and 11B having a horizontally long rectangular shape are displayed in such a manner as to be arranged in two areas in the vertical direction. In the window 11A of the upper area, thumbnails 12A of jacket images of pieces of music are displayed chronologically by year. That is, the thumbnails 12A are thumbnails of jackets of the best selling pieces of music in that year among the pieces of music sold in corresponding years, and these are displayed in such a manner as to be arranged in one horizontal line in the window 11A in chronological order of year in which they were sold. In the upper area of each of the thumbnails 12A, the "year" in which the piece of music of the thumbnail 12A was sold is displayed using a numeral 13A. Furthermore, in the lower area of the window 11A, a scroll bar 14A is displayed, and on both the left and right sides, scroll buttons 15A are displayed.

Similarly, in the window 11B of the lower area, thumbnails 12B of jacket images of pieces of music are displayed chronologically by month. In this case, each of the thumbnails 12B is a thumbnail of a jacket image of a piece of music that was the best selling piece of music in that month among the pieces of music sold in corresponding months, and the thumbnails are displayed in the window 11B in such a manner as to be arranged in one horizontal line in chronological order of month in which they were sold. The thumbnails 12B for corresponding months continue to the following year. That is, a thumbnail of December in a certain year is to the left of the thumbnail of January of the next year. In other words, a thumbnail of January of a certain year is to the right of a thumbnail of December of the previous year.

Above each of the thumbnails 12B, "year month" in which the piece of music of the thumbnail 12B was sold is displayed using a numeral 13B. Furthermore, in the lower portion of the window 11B, a scroll bar 14B is displayed, and scroll buttons 15B are displayed on both the right and left sides.

When the scroll bar 14A is dragged (moved) using a mouse (not shown) to the left or to the right, or when one of the scroll buttons 15A is depressed, the thumbnails 12A for corresponding years are continuously moved to the left or to the right. Therefore, when the scroll bar 14A or the scroll button 15A is operated, it is possible to display the thumbnail 12A of any year in the window 11A.

Similarly, when the scroll bar 14B or the scroll button 15B is operated, the thumbnails 12B for corresponding months are continuously moved to the left or to the right, so that the thumbnail 12B of any month can be displayed in the window 11B.

Figure 9:
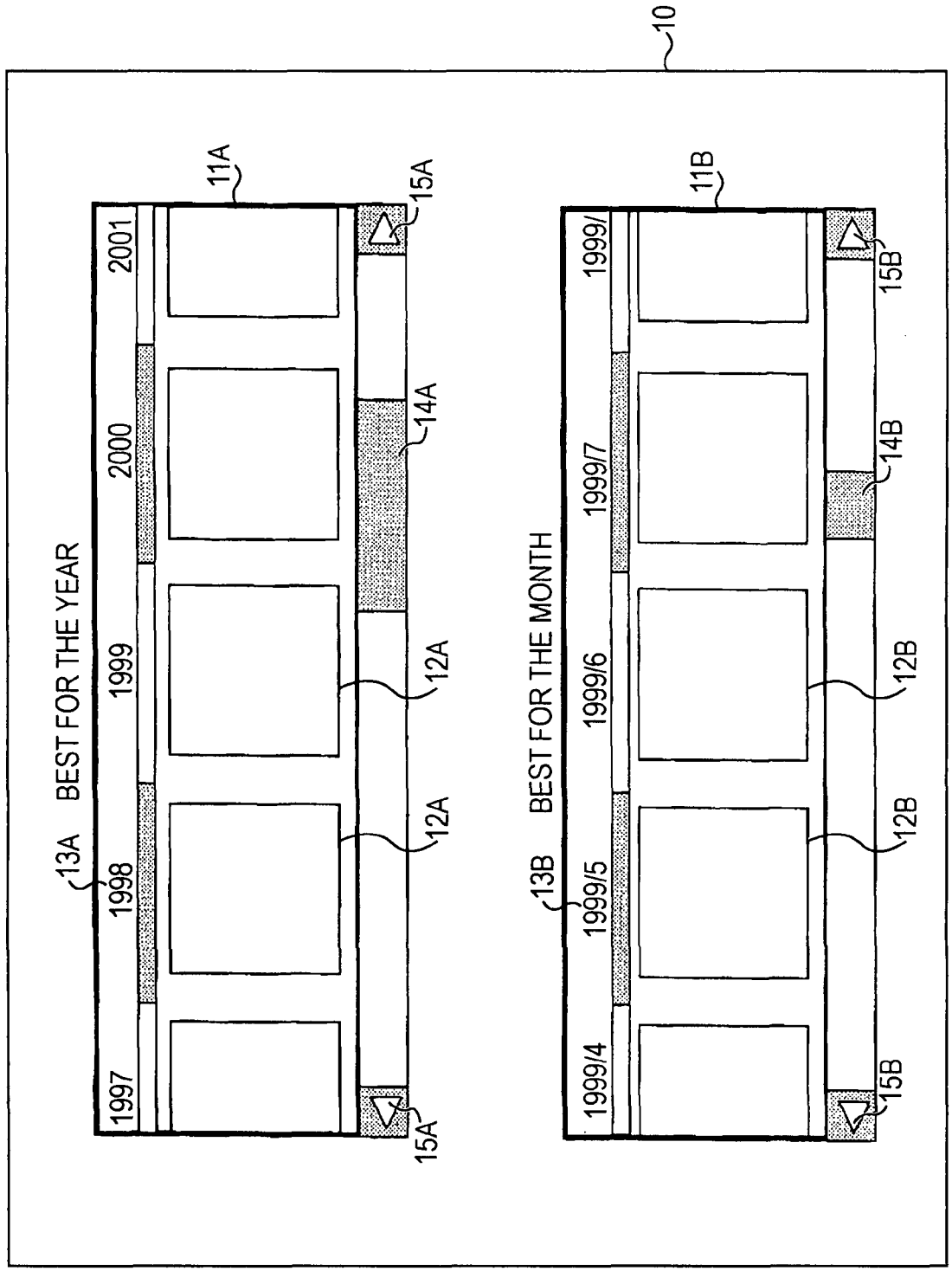
FIG. 9 illustrates an embodiment of the present invention.
Figure 10:
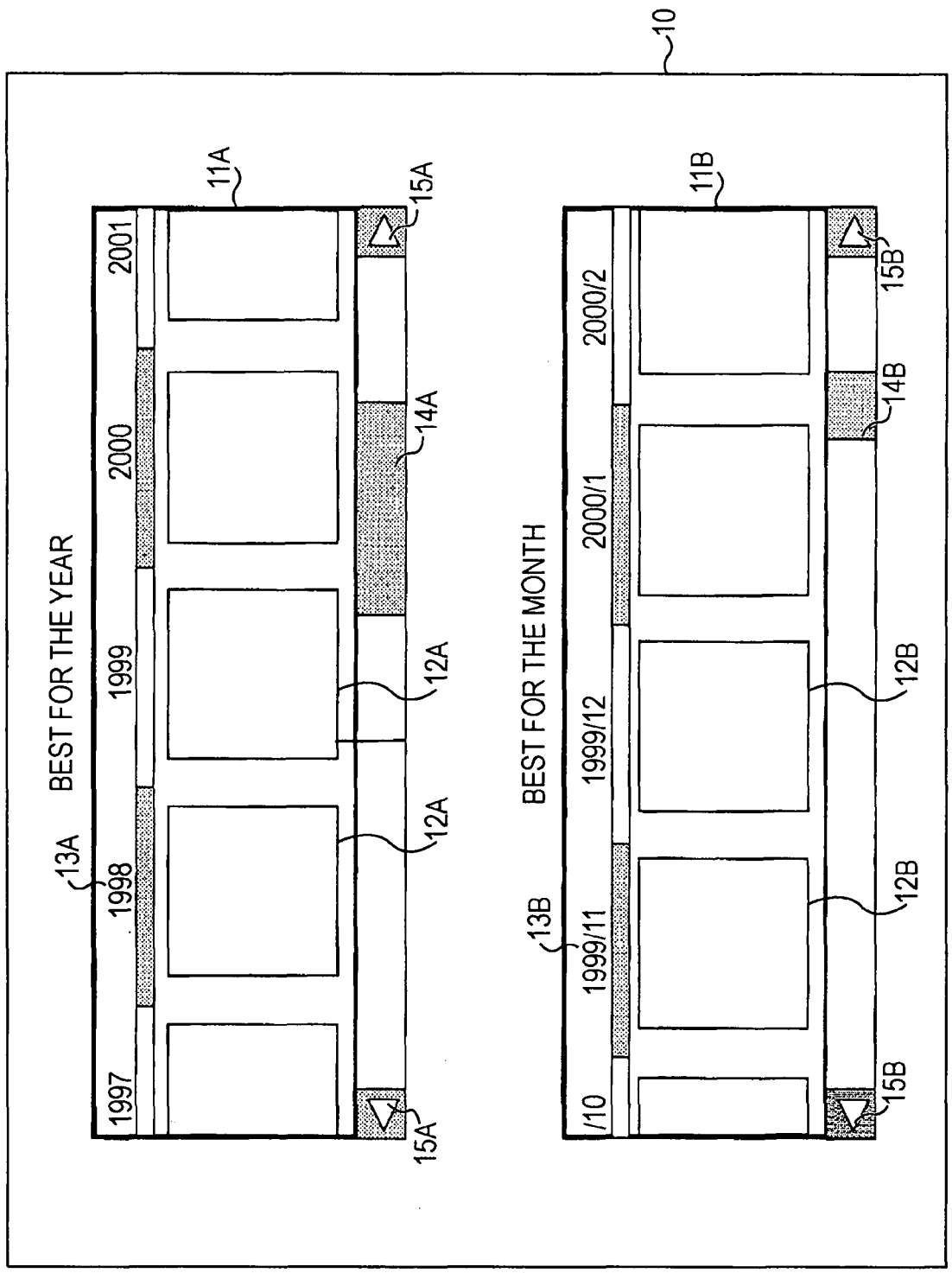
FIG. 10 illustrates an embodiment of the present invention.
Figure 11:
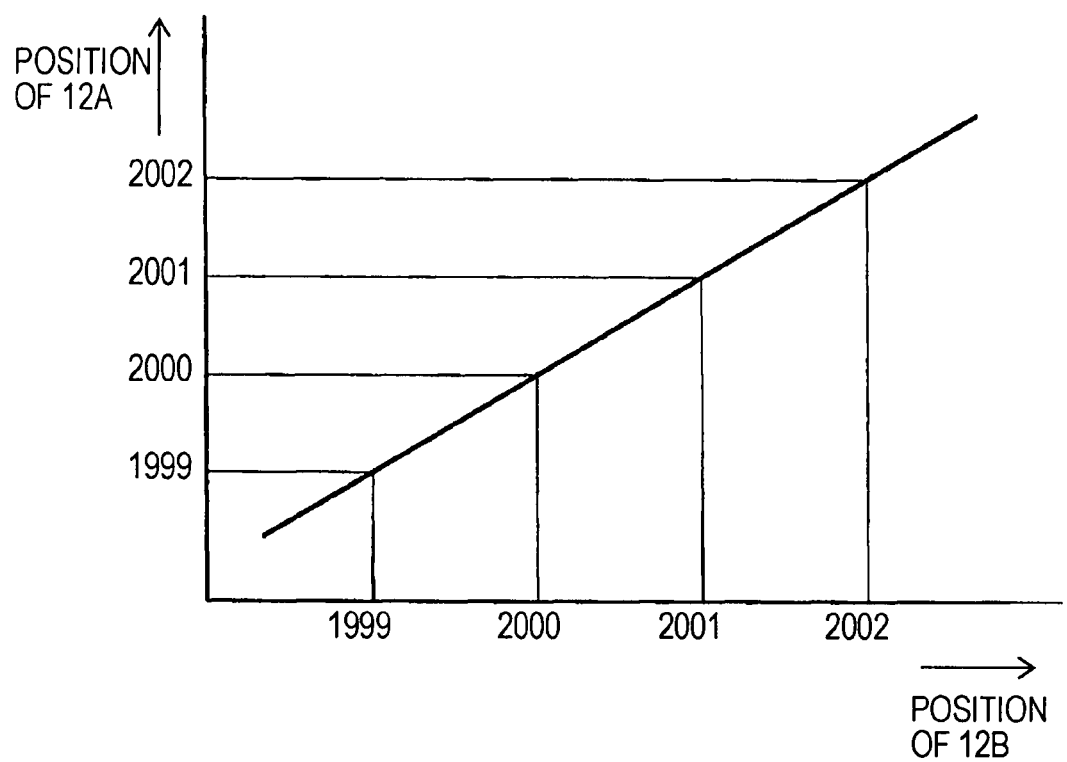
FIG. 11 illustrates an embodiment of the present invention.

Up to this point, the display method is the same as the display method illustrated in FIG. 9. In particular, in an embodiment of the present invention, the thumbnails 12A and 12B are synchronously moved in a non-linear manner as described below. In the following description, "a state in which the thumbnail 12B (or 12A) is being displayed in the window 11B (or 11A)" is assumed to include a state in which at least a portion of the thumbnail 12B is positioned in the center of the window 11B.

Figure 2:
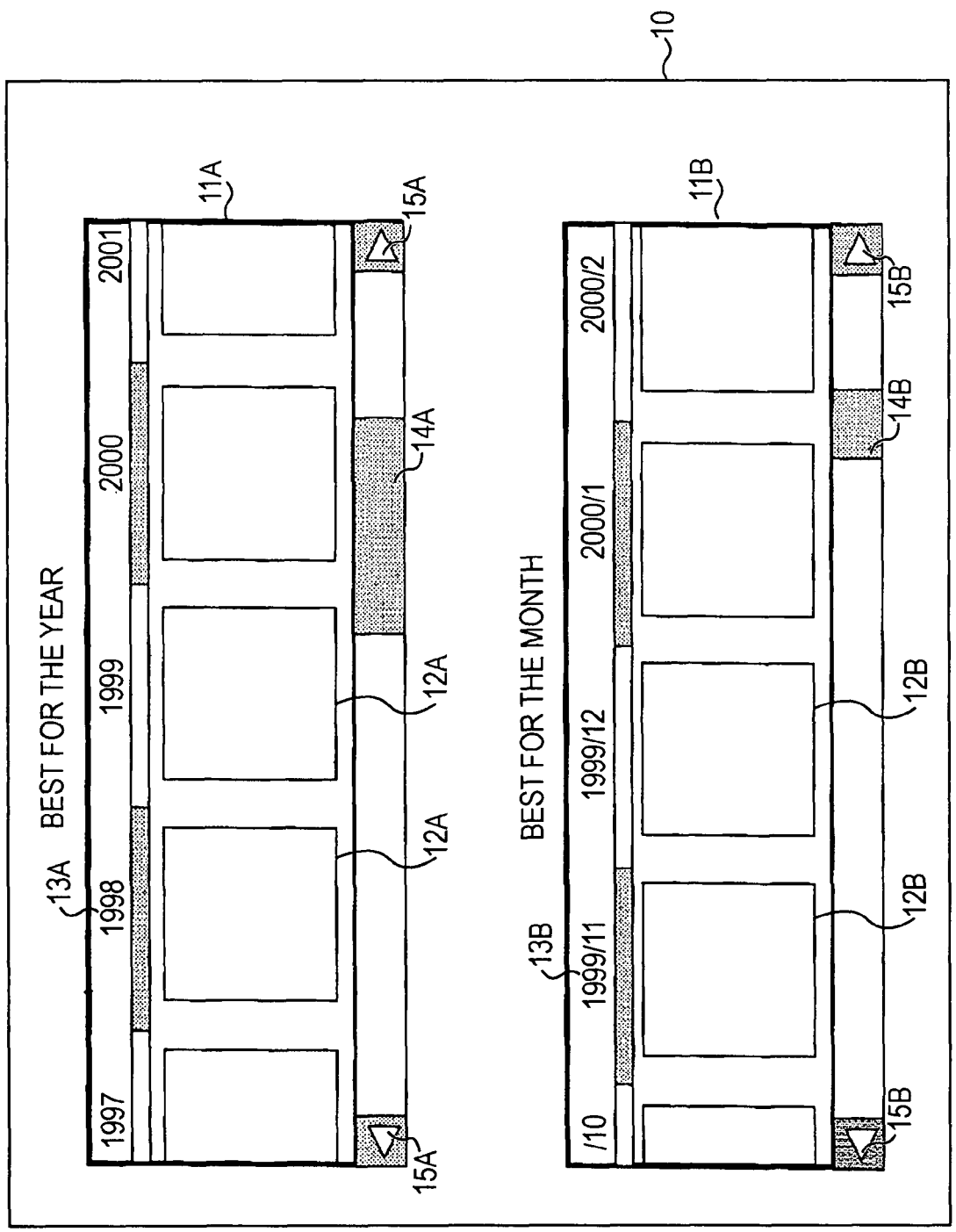
FIG. 2 shows an example of changes in a display according to an embodiment of the present invention.

That is, for example, as shown in FIG. 1, in a state in which a thumbnail of June 1999 as the thumbnail 12B for the corresponding month is displayed in the center of the window 11B, it is assumed that the scroll bar 14B or the scroll button 15B is operated to continuously scroll the thumbnails 12B, for example, as shown in FIG. 2, a thumbnail of December 1999 as the thumbnail 12B is displayed in the center of the window 11B.

However, even if the thumbnail 12B is placed in this display state, as shown in FIG. 2, the thumbnails 12A for corresponding years are not scrolled, and the thumbnail of 1999 is maintained to be positioned in the center of the window 11A similarly to the state of FIG. 1.

Figure 3:
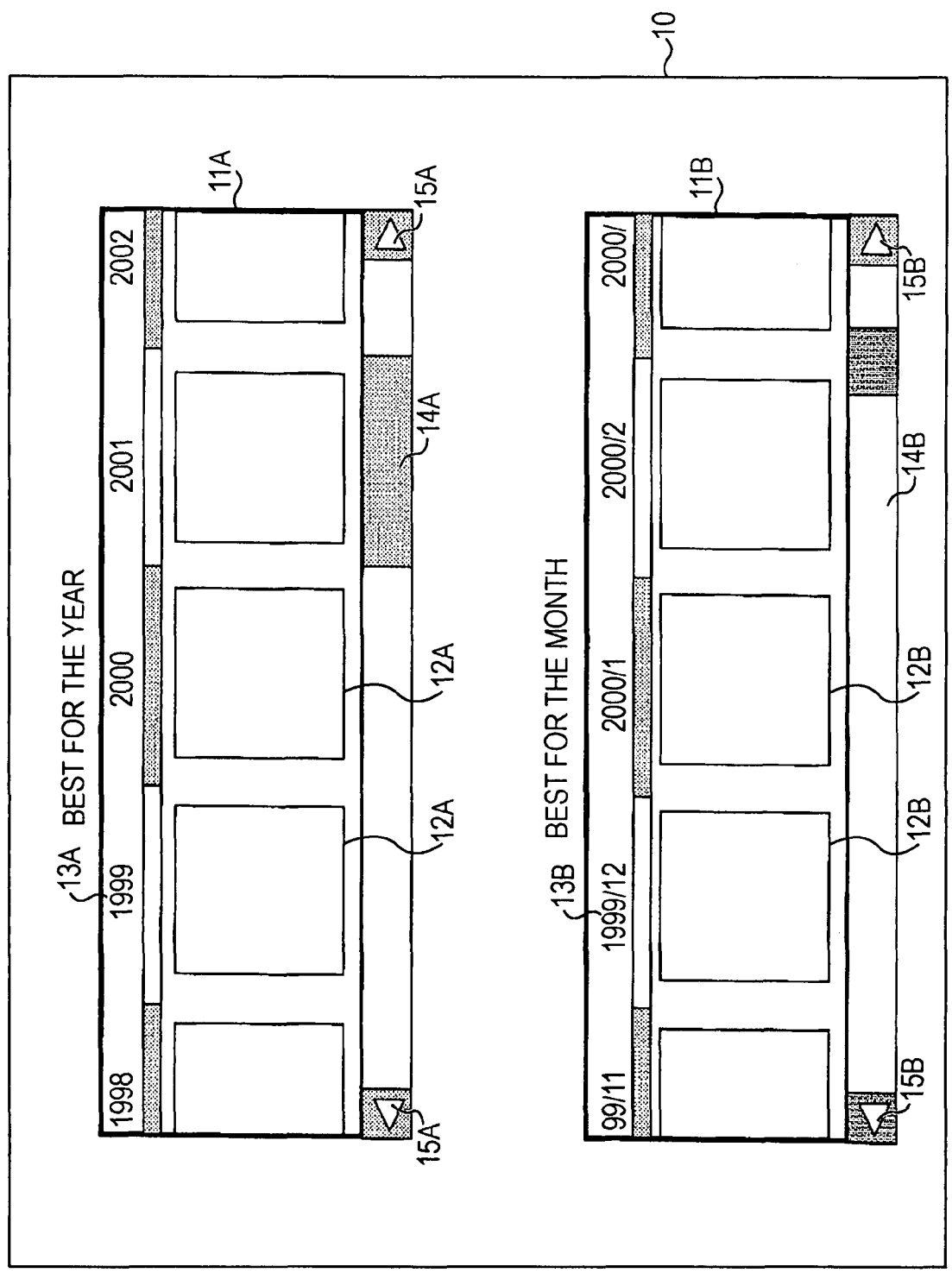
FIG. 3 shows an example of changes in a display according to an embodiment of the present invention.

Furthermore, it is assumed that the scroll bar 14B or the scroll button 15B is operated to continuously scroll the thumbnails 12B and, for example, as shown in FIG. 3, a thumbnail of January 2000 as the thumbnail 12B is displayed in the center of the window 11B. Then, in this case, as is also shown in FIG. 3, the thumbnails 12A for corresponding years are scrolled by an amount corresponding to one frame, and a thumbnail of 2000 is displayed in the center of the window 11A.

Even if the thumbnails 12B are scrolled in the direction of time passage hereafter in a similar manner, in a state in which the thumbnails 12B of January to December of 2000 are being displayed in the center of the window 11B, the thumbnail of 2000 as the thumbnail 12A for the corresponding year is maintained to be displayed in the center of the window 11A. Then, when a thumbnail of January 2001 as the thumbnail 12B is scrolled to the center of the window 11B, the thumbnails 12A are scrolled by an amount corresponding to one frame, and the thumbnail of 2001 is displayed in the center of the window 11A.

Conversely, for example, when the thumbnails 12B are continuously scrolled from the display state of FIG. 3, as shown in FIG. 2, the thumbnail of December 1999 as the thumbnail 12B is displayed in the center of the window 11B, the thumbnails 12A for corresponding years are scrolled, and the thumbnail of 1999 is displayed in the center of the window 11A.

Furthermore, as shown in FIG. 1, also, when the thumbnails 12B are scrolled so as to display the thumbnail of January 1999 in the center of the window 11B, the thumbnail 12A is maintained as is displayed, and the thumbnail of 1999 is maintained to be displayed in the center of the window 11A.

Even if the thumbnails 12B are scrolled in a direction reverse to the direction of time passage, in a state in which the thumbnails 12B of December 1999 to January 2000 are displayed in the center of the window 11B, the thumbnail of 1999 as the thumbnail 12A for the corresponding year is maintained to be displayed in the center of the window 11A. Next, when the thumbnail of December 1998 as the thumbnail 12B is scrolled to the center of the window 11B, the thumbnails 12A are scrolled by an amount corresponding to one frame, and the thumbnail of 1998 is displayed in the center of the window 11A.

Figure 4:
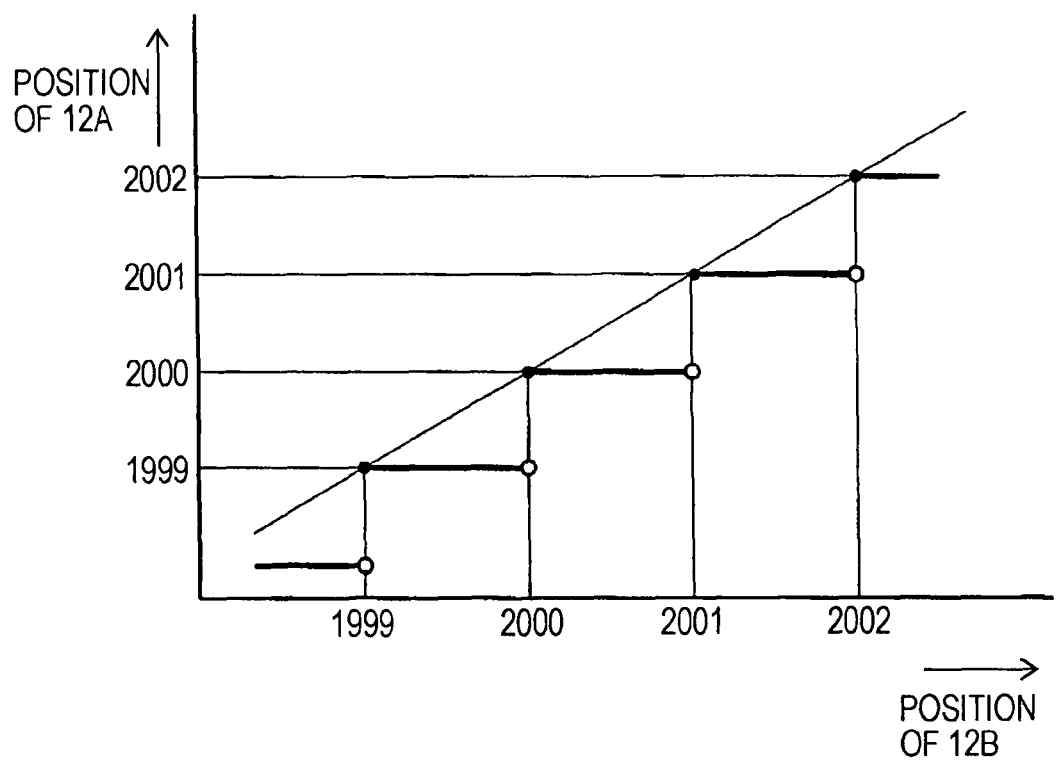
FIG. 4 is an illustration of operation according to an embodiment of the present invention.

That is, when the thumbnails 12B are scrolled, as is also shown in FIG. 4, in a state in which the thumbnail 12B of year N month n (N is a numeral indicating year, n is a numeral indicating month, which is one of 1 to 12) is displayed in the center of the window 11B, even if the thumbnail 12B is of any month, the thumbnail 12A of year N is displayed in the center of the window 11A. Therefore, even if the thumbnails 12B are continuously scrolled, the thumbnails 12A are scrolled in a step-like manner.

On the other hand, in the display state of FIG. 1 or FIG. 2, it is assumed that the scroll bar 14A or the scroll button 15A is operated to scroll the thumbnails 12A in the direction of time passage, so that, for example, as shown in FIG. 3, the thumbnail 12A of 2000 is displayed in the center of the window 11A. Then, as is also shown in FIG. 3, the thumbnails 12B for corresponding months are scrolled, and the thumbnail 12B of January 2000 is displayed in the center of the window 11B.

When the thumbnails 12A are scrolled in the direction of time passage hereafter in a similar manner and the thumbnails 12A from year (N−1) to year N are displayed in the center of the window 11A, the thumbnails 12B are scrolled in the direction of time passage, and the thumbnail 12B of January year N is displayed in the center of the window 11B.

Conversely, when the thumbnails 12A are scrolled in a direction reverse to the direction of time passage and thumbnails 12A from year (N+1) to year N are displayed in the center of the window 11A, the thumbnails 12B are scrolled in a direction reverse to the direction of time passage, and the thumbnail 12B of December year N is displayed in the center of the window 11B.

As in the foregoing description, in the above-described scrolling display, the thumbnails 12A for corresponding years and the thumbnails 12B for corresponding months are scrolled in a synchronous manner. As is also shown in FIG. 4, even if the thumbnails 12B for corresponding months are continuously scrolled, the thumbnails 12A for corresponding years are scrolled in a step-like manner in units of year.

Therefore, the correspondence between thumbnails 12A for corresponding years and thumbnails 12B for corresponding months is easy to understand. Furthermore, since thumbnails 12A for corresponding years and thumbnail 12Bs for corresponding months are displayed at the same time, the entirety can be viewed at a glance and also, a part thereof can be viewed in detail.

[2] Description of Hardware and Software

A description will be given here of hardware and software for implementing the above-described scrolling.

[2-1] Example of Hardware

Figure 5:
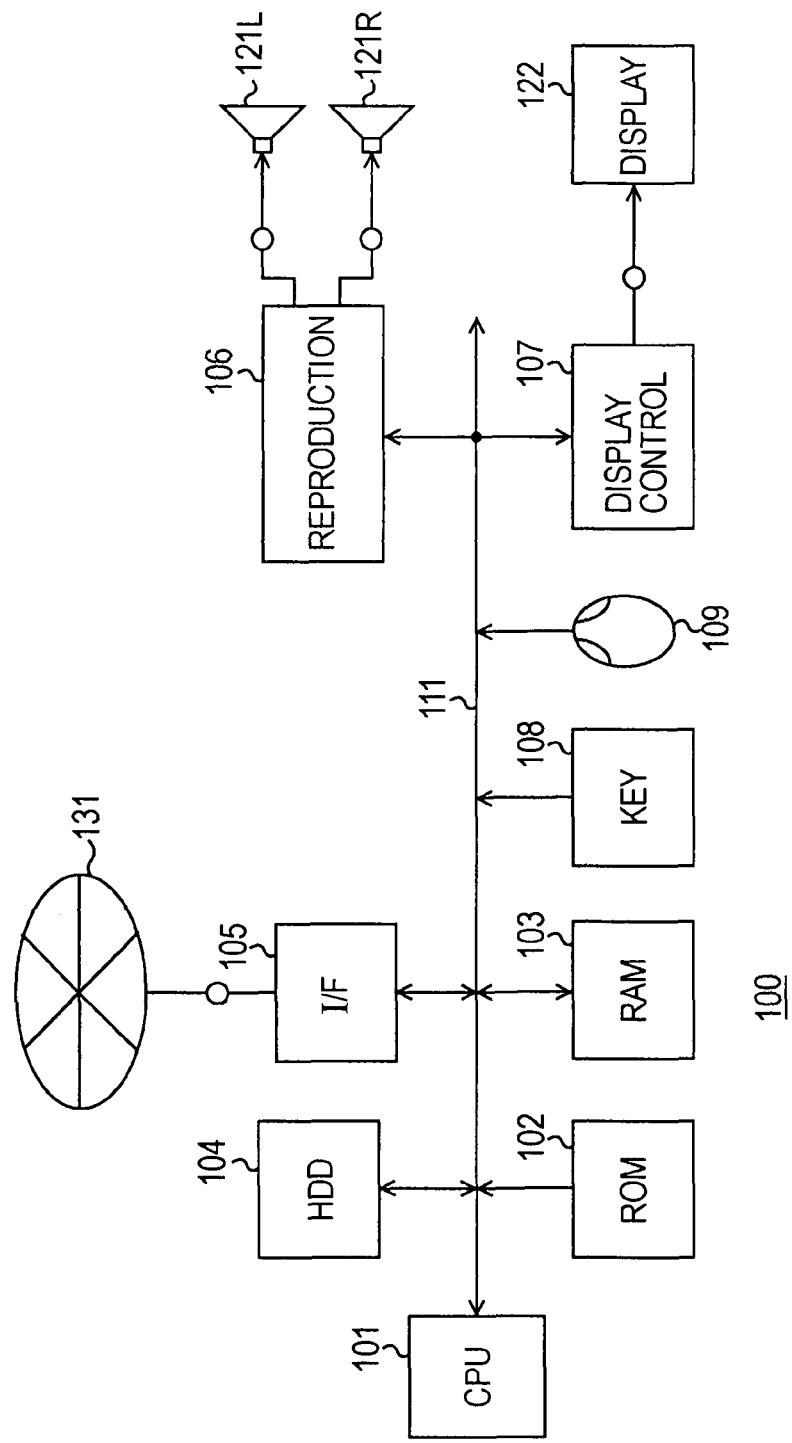
FIG. 5 is a system diagram showing an embodiment of the present invention.

In FIG. 5, a reference numeral 100 denotes an example of a personal computer to which the present invention is applied. The personal computer 100 is configured similar to a typical personal computer, and includes a CPU 101, a ROM 102, and a RAM 103.

In this case, the CPU 101 executes various kinds of programs. A BIOS executed by the CPU 101 and basic data have been written into the ROM 102. The RAM 102 serves as a work area when the CPU 101 executes a program, and the memories 102 and 103 are connected to the CPU 101 via a system bus 111.

Furthermore, a hard disk device 104 as a large-capacity storage is connected to the system bus 111. In this case, an OS for allowing the personal computer 100 to function, and a program for the implementation of the display of thumbnails, which is described with reference to [1], have been stored in the hard disk device 104. Furthermore, digital audio data to be reproduced as pieces of music, and image data with which jacket images of pieces of music are to be displayed as the thumbnails 12A and 12B have been stored in the hard disk device 104.

A communication interface circuit 105 is connected to the system bus 111, and the personal computer 100 is connected to an external network 131 via a communication interface circuit 105. A home server, a NAS, an external server, or a host network, and the like, which are not shown in FIG. 5, are connection to the network 131.

Furthermore, an audio reproduction circuit 106 and a display control circuit 107 are provided in the personal computer 100, and these components are also connected to the system bus 111. When digital audio data is supplied to the audio reproduction circuit 106, the audio reproduction circuit 106 converts the digital audio data into an analog audio signal and supplies the analog audio signal to speakers 121L and 121R.

The display control circuit 107 includes a video RAM (not shown). When display data is supplied to the video RAM, the display control circuit 107 repeatedly reads the display data at a predetermined periodic frequency, converts the display data into a video signal, and supplies the video signal to a display 122, whereby an image is displayed. Furthermore, a keyboard 108 and a mouse 109 as character input means and pointing devices are connected to the system bus 111.

[2-2] Example of Software

Figure 6:
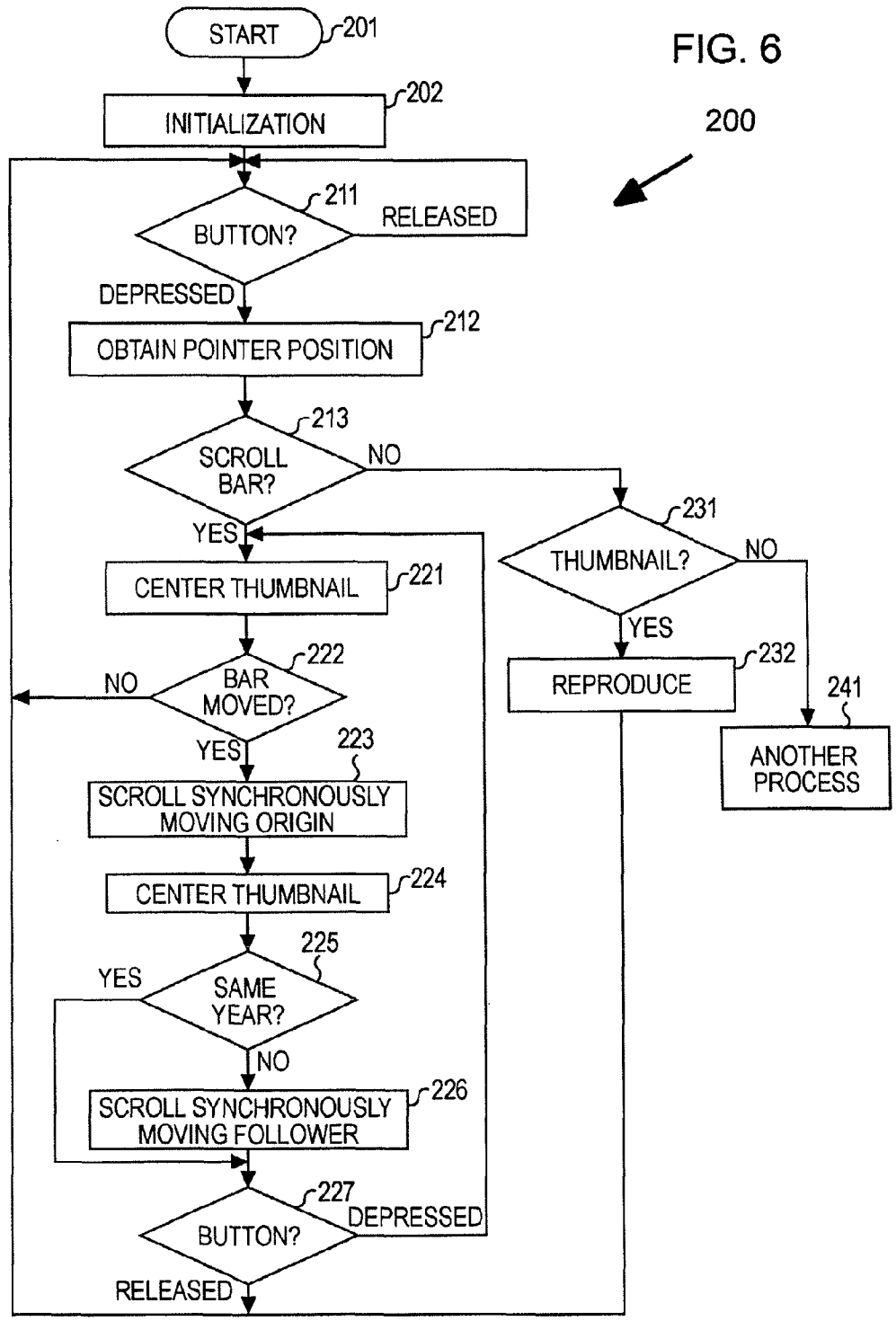
FIG. 6 is a flowchart showing an embodiment of the present invention.

FIG. 6 shows an example of a routine for scrolling thumbnails 12A and thumbnails 12B in synchronization with each other in a step-like manner, as described with reference to [1]. In the following, a case is described in which, when the thumbnails 12B are scrolled using the mouse 109, the thumbnails 12A are scrolled in synchronization with each other in a step-like manner. That is, the following is assumed:
the synchronously moving origins: the window 11B and the thumbnails 12B
the synchronously moving followers: the window 11A and the thumbnails 12A.

A routine 200 is provided in the hard disk device 104, and is loaded into the RAM 103 and executed by the CPU 101. In FIG. 6, for the routine 200, only the portions related to an embodiment of the present invention are extracted and shown. A case is shown in which a user performs necessary operations using the mouse 109.

That is, when the execution of the routine 200 is instructed, the processing of the CPU 101 starts from step 201 of the routine 200. Next, in step 202, initialization is performed. The initialization includes the following processing. Predetermined image data is read from the hard disk device 104 and is supplied to the display control circuit 107, and the windows 11A and 11B are displayed on the display 122. Also, for example, the image data of the thumbnails 12A and 12B stored in the hard disk device 104 are read and supplied to the display control circuit 107. As a result, the thumbnails 12A and 12B are displayed on a display 122 in the order of year and month, as shown in, for example, FIG. 1.

Next, in step 211, waiting for the left button of the mouse 109 to be depressed is done. When the left button of the mouse 109 is depressed, the process proceeds from step 211 to step 212, where the coordinates of the mouse pointer at this time are obtained. Next, it is determined in step 213 whether or not the mouse pointer, the coordinates of the mouse pointer being is obtained in step 212, is positioned within the scroll bar 14A or 14B. In this case, since the synchronously moving origins are the window 11B and the thumbnails 12B, the mouse pointer is positioned within the scroll bar 14B.

When the mouse pointer is positioned within the scroll bar 14B, the process proceeds from step 213 to step 221. In step 221, at this time, a thumbnail 12B1 (at least a portion thereof is positioned in the center of the window 11B) displayed in the center of the window 11B among the thumbnails 12B of the synchronously moving origin is determined. Next, it is determined in step 222 whether or not the scroll bar 14B has been moved (dragged) through the operation of the mouse.

Then, when the scroll bar 14B has been moved, the process proceeds from step 222 to step 223. In step 223, the thumbnails 12B that are the synchronously moving origins are scrolled in such a manner as to correspond to the movement direction and the amount of movement of the scroll bar 14B. In step 224, a thumbnail 12B2 (at least a portion thereof is positioned in the center of the window 11B) displayed in the center of the window 11B among the scrolled thumbnails 12B is determined.

Next, in step 225, it is determined whether or not the year of the thumbnail 12B1 determined to be positioned in the center in step 221 is the same as the year of the thumbnail 12B2 determined to be positioned in the center in step 224. When they are of different years, the process proceeds from step 225 to step 226. In step 226, the thumbnails 12A of the window 11A are scrolled by an amount corresponding to one year in the same direction as that of the thumbnails 12B, that is, by an amount corresponding to one frame. Thereafter, the process proceeds to step 227.

When it is determined in step 225 that the thumbnail 12B1 and the thumbnail 12B2 are of the same year, the process proceeds from step 225 to step 227, and the thumbnails 12A are not scrolled at this time.

Therefore, when the thumbnails 12B are scrolled, in the case that the year of the thumbnail 12B positioned in the center of the window 11B changes, the thumbnails 12A are scrolled by an amount corresponding to one year. When the year does not change even if the month of the thumbnail 12B changes, the thumbnails 12A are not scrolled. That is, as shown in FIG. 4, the thumbnails 12B and 12A are synchronously moved in a step-like manner.

Then, it is determined in step 227 whether or not the left button of the mouse 109 has been maintained depressed. When it has been maintained depressed, the process returns from step 227 to step 221. Therefore, when the movement of the scroll bar 14B is continued using the mouse 109, the thumbnails 12B are scrolled in response. Also, when the thumbnail 12B becomes a thumbnail of the next year or the previous year, the thumbnail 12A changes to a thumbnail after one year or before one year.

When it is determined in step 227 that the left button of the mouse 109 has not been depressed, the process returns from step 227 to step 211, where waiting for the left button of the mouse 109 to be depressed next is done. When it is determined in step 222 that the scroll bar 14B has not been moved, the process also returns from step 222 to step 211.

On the other hand, when the position of the mouse pointer, which is obtained in step 212, is determined in step 213, in the case that the mouse pointer is not positioned in the scroll bar 14B, the process proceeds from step 213 to step 231. In step 231, it is determined whether or not the mouse pointer is positioned in the thumbnail 12A or 12B.

When the mouse pointer is positioned in the thumbnail 12A or 12B, the process proceeds from step 231 to step 232. In step 232, digital audio data of the piece of music corresponding to the thumbnail at which the mouse pointer is positioned is read from the hard disk device 104, the read digital audio data signal is supplied to the reproduction circuit 106, whereby the digital audio data is D/A-converted into an analog audio signal, and the signal is supplied to the speakers 121L and 121R.

Therefore, when the reproduction of the thumbnails 12A or 12B displayed in the window 11A or 11B is instructed, the piece of music displayed as the thumbnail can be reproduced. When the reproduction of the piece of music is completed, in the case of the routine 200 of FIG. 6, the process of the CPU 101 returns from step 232 to step 211, and waiting for a next operation is done.

When it is determined in step 231 that the mouse pointer is not positioned in the thumbnail 12A or 12B, the process proceeds from step 231 to step 241. In step 241, processing corresponding to the position of the mouse pointer, for example, a completion process, is performed.

When the synchronously moving origin and the synchronously moving follower are reverse, that is, when the synchronously moving origins are the window 11A and thumbnails 12A and the synchronously moving followers are the window 11B and thumbnails 12B, step 226 in the routine 200 is changed. When the thumbnails 12A are scrolled in the direction of time passage, the thumbnail of January of the year after change is displayed as the thumbnail 12B in the center. When the thumbnails 12A are scrolled in a direction reverse to the direction of time passage, the thumbnail of December of the year after change may be displayed as the thumbnail 12B in the center.

[3] Other Examples of Display

[3-1] Example 1

Figure 7:
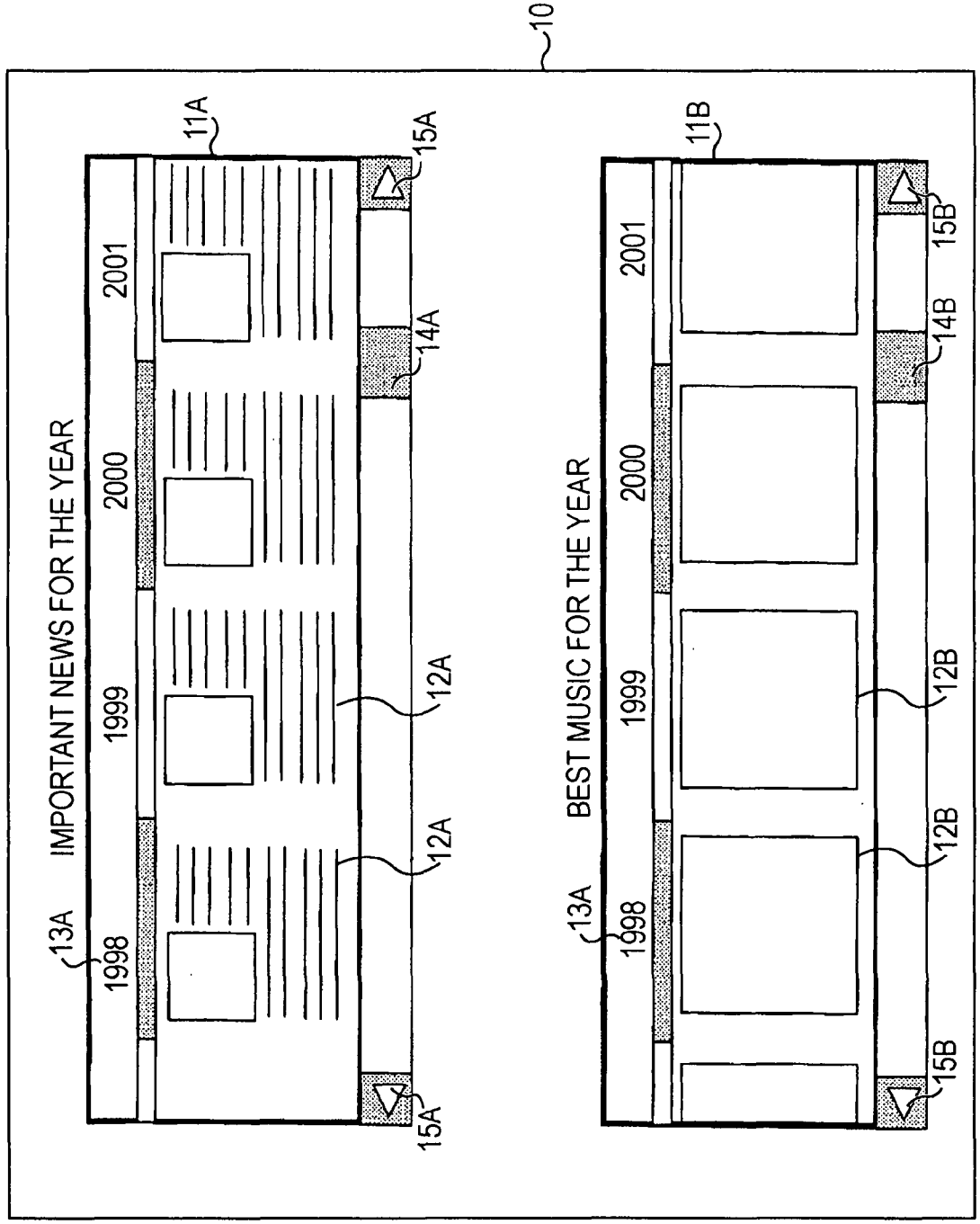
FIG. 7 is a schematic diagram showing another example of a display according to an embodiment of the present invention.

In an example shown in FIG. 7, a case is shown in which different items are displayed in synchronization between the window 11A and the window 11B. That is, in the window 11A, thumbnails 12A indicating important news for corresponding years are displayed in the order of year, and in the window 11B, thumbnails 12B of jacket images of the best selling pieces of music for corresponding years are displayed chronologically by year in which they were sold. In this example, the thumbnails 12A and 12B are displayed in such a manner that those of the same year are arranged vertically (in such a manner that the phase does not deviate).

Similarly to the case [1], when the thumbnails 12B are scrolled, the thumbnails 12A are scrolled in units of year in a synchronous manner in the same direction and at the same scrolling rate as those of the thumbnail 12B. Conversely, when the thumbnails 12A are scrolled, the thumbnails 12B are scrolled in units of year in a synchronous manner in the same direction and at the same scrolling rate as those of the thumbnail 12A.

When one of the thumbnails 12A is clicked, the details of the important news of the thumbnail 12A are displayed in the entire area of the display screen 10. When one of the thumbnails 12B is clicked, the piece of music of the thumbnail 12B is reproduced.

Therefore, it is possible to search for the thumbnail 12B of the target piece of music by using the thumbnails 12A displayed in the window 11A as a hint. Conversely, it is possible to know events of the year by using the thumbnail 12B that is the best selling piece of music as a hint.

Since the age information is transferred between the windows 11A and 11B, it is not necessary to match the first (start year) thumbnail with the final (end year) thumbnail between the thumbnails 12A in the window 11A and the thumbnails 12B in the window 11B. For example, the thumbnail 12B corresponding to the thumbnail 12A of a certain year may not exist. In that case, the portion corresponding to the thumbnail 12B may be set to be blank.

In this example, the resolutions of the thumbnail 12A and the thumbnail 12B are the same in units of year. However, even when the resolutions are in units of different periods of time, processing is possible similarly to the case [1].

[3-2] Example 2

Figure 8:
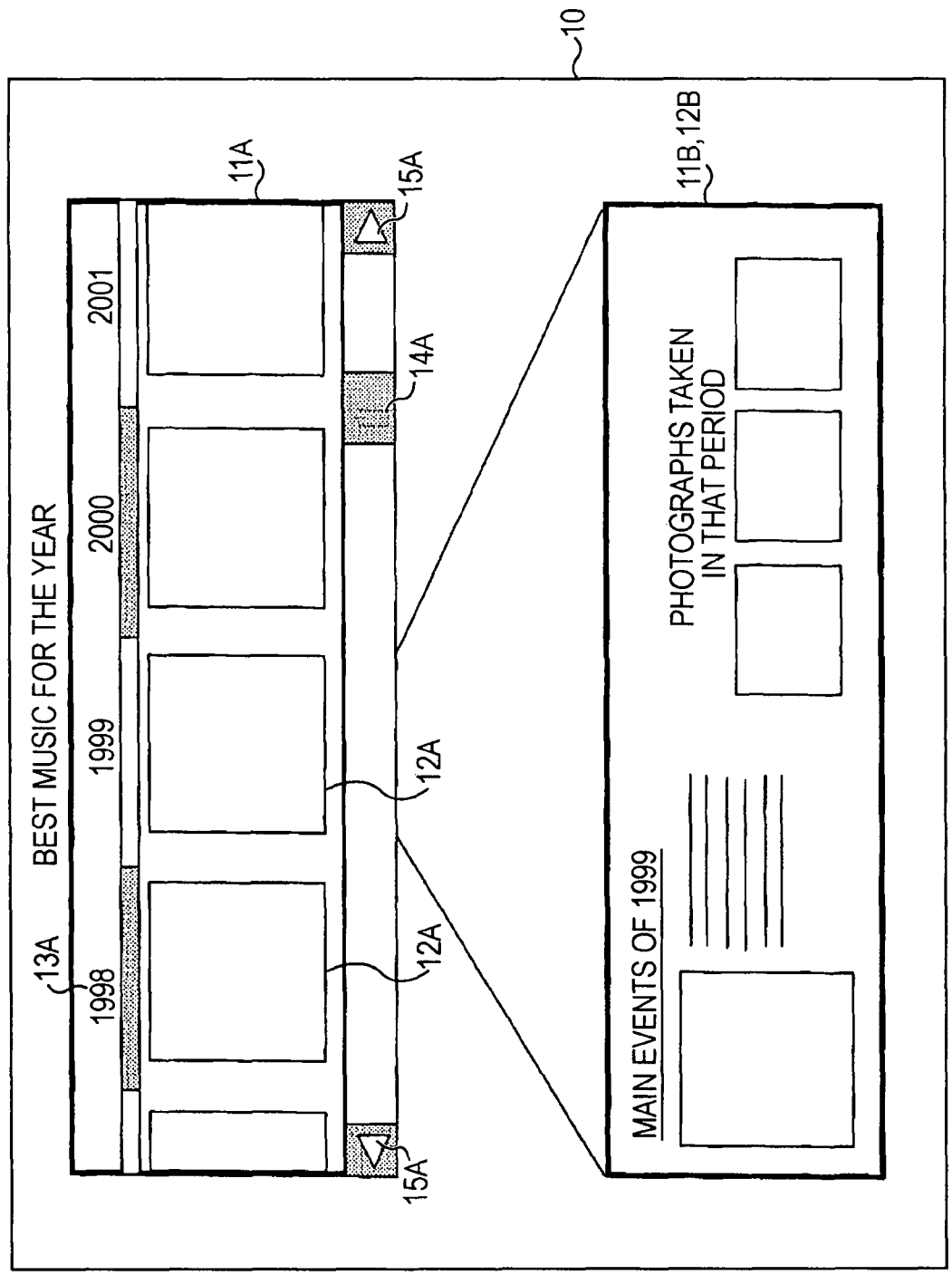
FIG. 8 is a schematic diagram showing another example of a display according to an embodiment of the present invention.

In an example shown in FIG. 8, a case is shown in which the thumbnails 12A of the best selling pieces of music for corresponding years are displayed in the window 11A, and in the window 11B, articles (information) that introduce events in the year indicated by the thumbnail 12A positioned in the center of the window 11A are displayed as the thumbnails 12B.

In the manner described above, the thumbnails 12B of the window 11B to which information is to be transferred does not necessarily need to be chronologically arranged information, and processing corresponding to the transferred age may be processing differing from a scrolling process.

[4] SUMMARY

According to the above-described scrolling method, in two windows 11A and 11B that are synchronously moved, when the thumbnails of the synchronously moving origin are scrolled, the scrolling result is transferred in units of the display of the thumbnails of the synchronously moving followers, and therefore, the thumbnails of the synchronously moving followers are scrolled in units of the display. Therefore, for example, as are also shown in FIGS. 1 to 3, the correspondence between thumbnails 12A for corresponding years and thumbnails 12B for corresponding months are easy to understand. It is possible to instantly know the correspondence between the thumbnails 12A and 12B of the two windows 11A and 11B.

For example, since the thumbnails 12A for corresponding years and the thumbnails 12B for corresponding months are displayed at the same time, the entirety can be viewed at a glance and also, a part thereof can be viewed in detail. Furthermore, for example, as shown in FIG. 7, there is no need to achieve matching of the start point and the end point of data between the window of the synchronously moving origin and the window of the synchronously moving follower. For the processing of the window of the synchronously moving follower, in addition to scrolling, processing corresponding to the transferred information can be performed.

In the foregoing description, a case has been described in which the thumbnails 12A of the window 11A and the thumbnail 12B of the window 11B are used for jacket images of CDs. The thumbnails can also be thumbnails of chronological tables, covers of books, various kinds of materials, private photographs, still images, moving images, content such as pieces of music that can be downloaded via the network 131, and the like. In those cases, when the target thumbnail 12A or 12B is clicked, it is also possible to display the content (main body) that provides the thumbnails at its original size and download it.

Furthermore, in the foregoing description, the scrolling direction of the windows 11A and 11B is along a time axis. For example, in an address book, thumbnails 12A of letters of the alphabet indicating beginning letters of names can also be displayed in the window 11A. In the window 11B, names, photographs, and the like of persons with the letter beginnings of the thumbnails positioned in the center of the window 11A can also be displayed, and the content of the windows 11A and 11B can also be scrolled as described in [1].

That is, displays may be performed in the following manner.

(A) The thumbnails 12A of items (for example, year N) classified in terms of wide classification are displayed in a predetermined order in the window 11A.

(B) The thumbnails 12B of items (for example, month n) classified in terms of narrow classification are displayed in a predetermined order in the window 11B.

(C) The display of the thumbnails 12A and 12B is set to be scrollable.

(D) When items (year N month n) in terms of narrow classification corresponding to the thumbnail 12B positioned in the center of the window 11B are contained in certain items (year N) in terms of wide classification, the thumbnails 12A of the items (year N) in terms of wide classification are typically displayed in the center of the window 11A.

It should be understood by those skilled in the art that various modifications, combinations, sub-combinations and alterations may occur depending on design requirements and other factors insofar as they are within the scope of the appended claims or the equivalents thereof.

What is claimed is:

1. A display scrolling method comprising:
displaying first and second windows on a display screen of a display;
displaying a first scroll bar having a first length dimension in the first window and a second scroll bar having a second length dimension in the second window;
evaluating a characteristic of media content over different time periods, wherein the evaluating is based, at least in part, on sales information indicating when the media content was sold or ratings information associated with the media content;
displaying first information in a first predetermined order in the first window, wherein the first information represents the characteristic of the media content evaluated over first time periods corresponding to a first unit of classification of the first information;
displaying second information in a second predetermined order in the second window, wherein the second information represents the characteristic of the media content evaluated over second time periods corresponding to a second unit of classification of the second information, wherein the second unit of classification is different than the first unit of classification; and
scrolling the first and second information in synchronization with each other,
wherein a resolution of the scrolling of the first information is set at a magnitude corresponding to the first unit of classification and a resolution of the scrolling of the second information is set at a magnitude corresponding to the second unit of classification.

2. The display scrolling method according to claim 1, wherein the first and second information are displayed on the basis of time information provided therein.

3. The display scrolling method according to claim 1, wherein the first unit of classification is year, and the second unit of classification is month.

4. The display scrolling method according to claim 1, wherein the display of the first and second information is a display using an image corresponding to the information, and wherein the method further comprises:
receiving a selection of an image displayed in the first or second window; and
reproducing media content corresponding to the image in response to receiving the selection of the image.

5. The display scrolling method according to claim 1, wherein the first and/or second information comprises at least one thumbnail associated with the media content.

6. The display scrolling method according to claim 5, wherein the media content comprises music content.

7. The display scrolling method according to claim 5, wherein the media content comprises news content.

8. The display scrolling method according to claim 5, wherein the first information is a first media content type and the second information is a second media content type, wherein the first media content type and the second media content type are different.

9. The display scrolling method according to claim 1, wherein the first length dimension and the second length dimension are determined based, at least in part, on the unit of classification of the first information and the second information, respectively.

10. The display scrolling method according to claim 1, wherein evaluating the characteristic of media content comprises receiving the sales information or ratings information associated with the media content via a network.

11. A display scrolling method comprising:
displaying first and second windows on a display screen of a display in such a manner as to be arranged;
displaying a first scroll bar having a first length dimension in the first window and a second scroll bar having a second length dimension in the second window;
evaluating a characteristic of media content over different time periods, wherein the evaluating is based, at least in part, on sales information indicating when the media content was sold or ratings information associated with the media content;
displaying first information in terms of wide classification in a first predetermined order in the first window, wherein the first information the characteristic of the media content evaluated over first time periods corresponding to a unit of the wide classification;

displaying second information displayed in the first window in a second predetermined order in terms of narrow classification in the second window, wherein the second information represents the characteristic of the media content evaluated over second time periods corresponding to a unit of the narrow classification; and scrolling the first information displayed in terms of wide classification in the first window in synchronization with the scrolling of the second information in the second window.

12. A display apparatus comprising:

a display;

obtaining means for obtaining first and second information, wherein each of the first and second information represents a characteristic of media content evaluated over different time periods, wherein the evaluating is based, at least in part, on sales information indicating when the media content was sold or ratings information associated with the media content; and control means for allowing the display to display the first and second information, wherein the control means:

displays first and second windows on the display screen of the display;

displays a first scroll bar having a first length dimension in the first window and a second scroll bar having a second length dimension in the second window;

displays the first information in a first predetermined order in the first window, wherein the first information represents the characteristic of the media content evaluated over first time intervals corresponding to a first unit of classification of the first information;

displays the second information in a second predetermined order in the second window, wherein the second information represents the characteristic of the media content evaluated over first time intervals corresponding to a second unit of classification, wherein the second unit of classification is different than the first unit of classification; and scrolls the first and second information in synchronization with each other;

wherein a resolution of the scrolling of the first information is set at a magnitude corresponding to the first unit of classification and a resolution of the scrolling of the second information is set at a magnitude corresponding to the second unit of a classification.

13. A non-transitory recording medium having recorded thereon a display program that, when executed by a computer performs a method comprising:

displaying first and second windows on a display screen of a display;

displaying a first scroll bar having a first length dimension in the first window and a second scroll bar having a second length dimension in the second window;

evaluating a characteristic of media content over different time periods, wherein the evaluating is based, at least in part, on sales information indicating when the media content was sold or ratings information associated with the media content;

displaying first information in a first predetermined order in the first window, wherein the first information represents the characteristic of the media content evaluated over first time periods corresponding to a first unit of classification of the first information;

displaying second information in a second predetermined order in the second window, wherein the second information represents the characteristic of the media content evaluated over second time periods corresponding to a second unit of classification of the second information, wherein the second unit of classification is different than the first unit of classification; and scrolling the first and second information in synchronization with each other, wherein a resolution of the scrolling of the first information is set at a magnitude corresponding to the first unit of classification and a resolution of the scrolling of the second information is set at a magnitude corresponding to the second unit of a classification.

14. A display apparatus comprising:

a display;

an obtaining section configured to obtain first and second information, wherein each of the first and second information represents a characteristic of media content evaluated over different time periods, wherein the evaluating is based, at least in part, on sales information indicating when the media content was sold or ratings information associated with the media content; and a controller configured to cause the display to:

display the first information in a first predetermined order in a first window, wherein the first information represents the characteristic of the media content evaluated over first time intervals corresponding to a first unit of classification of the first information;

display the second information in a second predetermined order in a second window, wherein the second information represents the characteristic of the media content evaluated over second time intervals corresponding to a second unit of classification of the second information, wherein the second unit of classification is different than the first unit of classification;

display a first scroll bar having a first length dimension in the first window and a second scroll bar having a second length dimension in the second window; and scroll the first and second information in synchronization with each other, wherein a resolution of the scrolling of the first information is set at a magnitude corresponding to the first unit of classification and a resolution of the scrolling of the second information is set at a magnitude corresponding to the second unit of classification.

15. The display apparatus according to claim 14, wherein obtaining the first and second information comprises receiving the first and second information via a network.

* * * * *